(12) United States Patent
Bratfisch et al.

(10) Patent No.: US 9,544,070 B2
(45) Date of Patent: Jan. 10, 2017

(54) FREQUENCY-CONVERTING SENSOR AND SYSTEM FOR PROVIDING A RADIO FREQUENCY SIGNAL PARAMETER

(71) Applicant: Rohde & Schwarz GmbH & Co. KG, Munich (DE)

(72) Inventors: Toralf Bratfisch, Putzbrunn (DE); Michael Katzer, Munich (DE); Kurt Schmidt, Grafing (DE); Marcel Thraenhardt, Munich (DE); Thomas Reichel, Lichtenau (CH)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 14/599,987

(22) Filed: Jan. 19, 2015

(65) Prior Publication Data

US 2016/0099784 A1 Apr. 7, 2016

Related U.S. Application Data

(60) Provisional application No. 62/060,189, filed on Oct. 6, 2014.

(51) Int. Cl.
*H04B 17/23* (2015.01)
*H04B 17/318* (2015.01)
(Continued)

(52) U.S. Cl.
CPC ............ *H04B 17/23* (2015.01); *H04B 17/101* (2015.01); *H04B 17/318* (2015.01); *H04L 2027/0016* (2013.01)

(58) Field of Classification Search
CPC ............... H04L 27/063; H04L 27/1525; H04L 25/03019; H04L 27/06; H04L 1/0631; H04L 1/0091; H04L 1/0045; H04L 27/2647; H04L 27/22; H04L 27/02; H04L 2025/03382; H04B 17/0065; H04B 1/06; H04B 10/60; H04B 1/032; H04B 7/084; H03D 1/24
(Continued)

(56) References Cited

U.S. PATENT DOCUMENTS 5,574,509 A * 11/1996 Citta .................... H01Q 1/1257
348/563
5,604,927 A * 2/1997 Moore .................. H03H 19/00
327/558
(Continued)

FOREIGN PATENT DOCUMENTS

DE 102008052335 A1 4/2010

*Primary Examiner* — Emmanuel Bayard
(74) *Attorney, Agent, or Firm* — Potomac Technology Law, LLC

(57) ABSTRACT

A frequency-converting sensor is provided for generating at least a radio frequency signal parameter, such as an electrical power value. The sensor comprises an analog receiving section configured to convert an input signal into corresponding I/Q components using a local oscillator frequency, an analog to digital converting unit configured to convert the corresponding analog I/Q values into digital I/Q values, and a digital processing unit. The digital processing unit comprises an adjustable filtering unit configured to select a sideband of the digital I/Q values, and a calculating unit configured to calculate the radio frequency signal parameter from the I/Q-values of the selected sideband. A system is further provided for analyzing radio frequency input signal parameters, wherein the system incorporates a device under test, which generates the radio frequency signal, the sensor and a display device.

21 Claims, 12 Drawing Sheets

(51) Int. Cl.
*H04B 17/10* (2015.01)
*H04L 27/00* (2006.01)

(58) Field of Classification Search
USPC ........ 375/224, 227–228, 316, 319, 320, 350
See application file for complete search history.

(56) References Cited

U.S. PATENT DOCUMENTS

| | | | | |
|---|---|---|---|---|
| 5,963,856 A * | 10/1999 | Kim | .................. | H03D 7/161 455/285 |
| 6,330,290 B1 * | 12/2001 | Glas | .................. | H03D 3/009 329/306 |
| 6,516,184 B1 * | 2/2003 | Damgaard | ............ | H04B 1/406 375/295 |
| 6,978,125 B2 * | 12/2005 | Lindell | .................. | H03J 3/08 455/183.1 |
| 6,980,609 B1 * | 12/2005 | Ahn | .................. | H04L 27/06 375/341 |
| 7,013,124 B2 * | 3/2006 | Yasuda | .................. | H04B 1/005 348/731 |
| 7,116,955 B2 * | 10/2006 | Schaffer | ............. | H03G 3/3068 375/345 |
| 7,272,375 B2 * | 9/2007 | Tuttle | .................. | H04B 1/30 455/150.1 |
| 7,324,616 B2 * | 1/2008 | Sobchak | ............. | H04B 1/1036 375/144 |
| 7,340,230 B2 * | 3/2008 | Khoini-Poorfard | .... | H03D 3/006 348/E5.097 |
| 7,436,910 B2 * | 10/2008 | Fudge | .................. | H04B 1/0003 375/340 |
| 7,539,476 B2 * | 5/2009 | Devries | .................. | H04B 1/28 331/172 |
| 7,560,889 B2 * | 7/2009 | Kimmelmann | ...... | G11B 7/0901 318/600 |
| 7,599,673 B2 * | 10/2009 | Maxim | .................. | H03D 3/006 455/179.1 |
| 7,626,526 B2 * | 12/2009 | Philips | .................. | H03M 3/382 341/143 |
| 7,697,550 B2 * | 4/2010 | Rada | .................. | H04L 47/14 370/401 |
| 7,904,040 B2 * | 3/2011 | Khoini-Poorfard | .... | H03D 3/006 375/136 |
| 7,995,147 B2 * | 8/2011 | Diemer | ............... | H04N 5/4446 348/607 |
| 8,412,094 B2 * | 4/2013 | Schmid | .................. | G01S 1/245 342/457 |
| 8,483,647 B2 * | 7/2013 | Kaukovuori | .......... | H04B 1/16 375/324 |
| 8,514,919 B2 * | 8/2013 | Estrada | .................. | G01R 19/2516 324/318 |
| 8,519,878 B2 * | 8/2013 | Jensen | .................. | H03M 3/396 341/120 |
| 8,567,258 B2 * | 10/2013 | Belotserkovsky | ..... | A61B 5/208 73/861 |
| 8,634,496 B2 * | 1/2014 | De Rore | ............ | H04L 25/0212 375/260 |
| 8,712,354 B2 * | 4/2014 | Zhang | .................. | H03J 1/0091 455/160.1 |
| 8,848,110 B2 * | 9/2014 | Khoini-Poorfard | .... | H03G 3/001 348/678 |
| 8,943,112 B2 * | 1/2015 | Pagnanelli | ........................ | 708/5 |
| 9,026,390 B2 * | 5/2015 | Martin | ............... | G01R 13/0254 702/124 |
| 9,077,366 B2 * | 7/2015 | Jensen | .................. | H03M 3/396 |
| 9,084,571 B2 * | 7/2015 | Belotserkovsky | ..... | A61B 5/208 |
| 9,100,622 B2 * | 8/2015 | Reddy | .................. | H04B 1/0014 |
| 9,118,358 B2 * | 8/2015 | Laroia | .................. | H04B 1/005 |
| 9,124,340 B2 * | 9/2015 | Le Naour | ............ | H04B 1/0032 |
| 9,171,440 B2 * | 10/2015 | Frederick | ............. | G08B 13/248 |
| 9,172,575 B2 * | 10/2015 | Akahori | ............. | H04L 27/2663 |
| 9,176,233 B2 * | 11/2015 | Khalili | .................. | G01S 19/21 |
| 9,231,552 B2 * | 1/2016 | Taniuchi | .................. | H03H 7/465 |
| 9,343,965 B2 * | 5/2016 | Yuan | .................. | H02M 3/156 |
| 2002/0127982 A1 * | 9/2002 | Haapoja | ................. | H03D 3/009 455/130 |
| 2004/0205827 A1 * | 10/2004 | Krone | .................. | H03J 1/0041 725/131 |
| 2006/0064725 A1 * | 3/2006 | Rabinowitz | ........... | G01S 5/0036 725/68 |
| 2006/0078069 A1 * | 4/2006 | Seendripu | .............. | H03D 7/166 375/316 |
| 2006/0122814 A1 * | 6/2006 | Beens | .................. | G06F 15/7864 702/189 |
| 2007/0111691 A1 * | 5/2007 | Hanke | .................... | H04B 1/005 455/239.1 |
| 2009/0092177 A1 | 4/2009 | Dvorak et al. | | |
| 2009/0154446 A1 * | 6/2009 | Adler | ...................... | H04B 1/40 370/350 |
| 2009/0311973 A1 * | 12/2009 | Zhang | .................. | H04B 1/034 455/77 |
| 2010/0007355 A1 * | 1/2010 | Olgaard | .............. | H04B 17/327 324/601 |
| 2010/0100340 A1 | 4/2010 | Reichel et al. | | |
| 2010/0119012 A1 * | 5/2010 | Pal | ...................... | H04B 1/0039 375/324 |
| 2010/0171659 A1 * | 7/2010 | Waters | .................. | H04B 17/24 342/357.74 |
| 2010/0232490 A1 * | 9/2010 | Balakrishnan | ......... | H03D 3/009 375/227 |
| 2010/0309317 A1 * | 12/2010 | Wu | ...................... | H04W 16/14 348/180 |
| 2012/0020397 A1 * | 1/2012 | Estrada | .................. | G01R 23/16 375/224 |
| 2012/0026407 A1 * | 2/2012 | Zhang | .................. | H04B 1/0032 348/731 |
| 2012/0257694 A1 * | 10/2012 | Balakrishnan | ....... | H04B 1/1646 375/340 |
| 2013/0195459 A1 * | 8/2013 | Shieh | ................. | H04B 10/2507 398/79 |
| 2014/0029683 A1 * | 1/2014 | Morris | .................... | H04B 1/62 375/267 |
| 2014/0286382 A1 * | 9/2014 | Dark | .................. | H04B 17/104 375/227 |
| 2014/0355726 A1 * | 12/2014 | Elenes | ............. | H04L 25/03834 375/343 |
| 2015/0005585 A1 * | 1/2015 | Xu | .................... | A61B 5/0402 600/300 |
| 2015/0030103 A1 * | 1/2015 | Hormis | .................. | H04L 27/364 375/296 |
| 2015/0091745 A1 * | 4/2015 | Pagnanelli | ............ | H03M 3/468 341/143 |
| 2015/0178718 A1 * | 6/2015 | Liu | .................... | G06K 19/0728 705/67 |

* cited by examiner

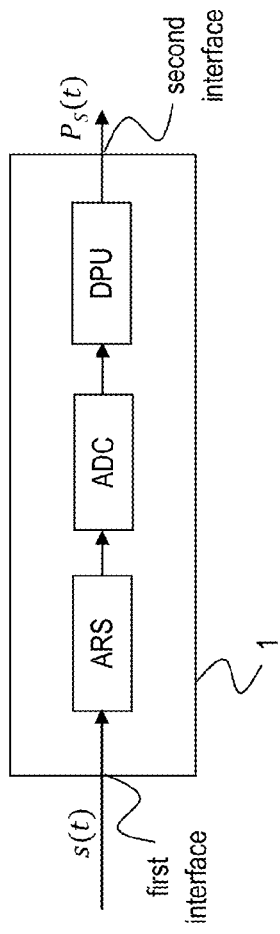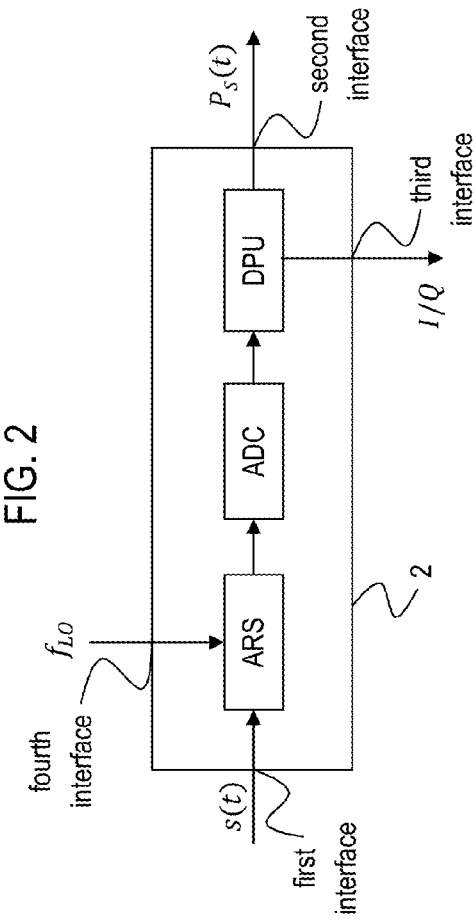

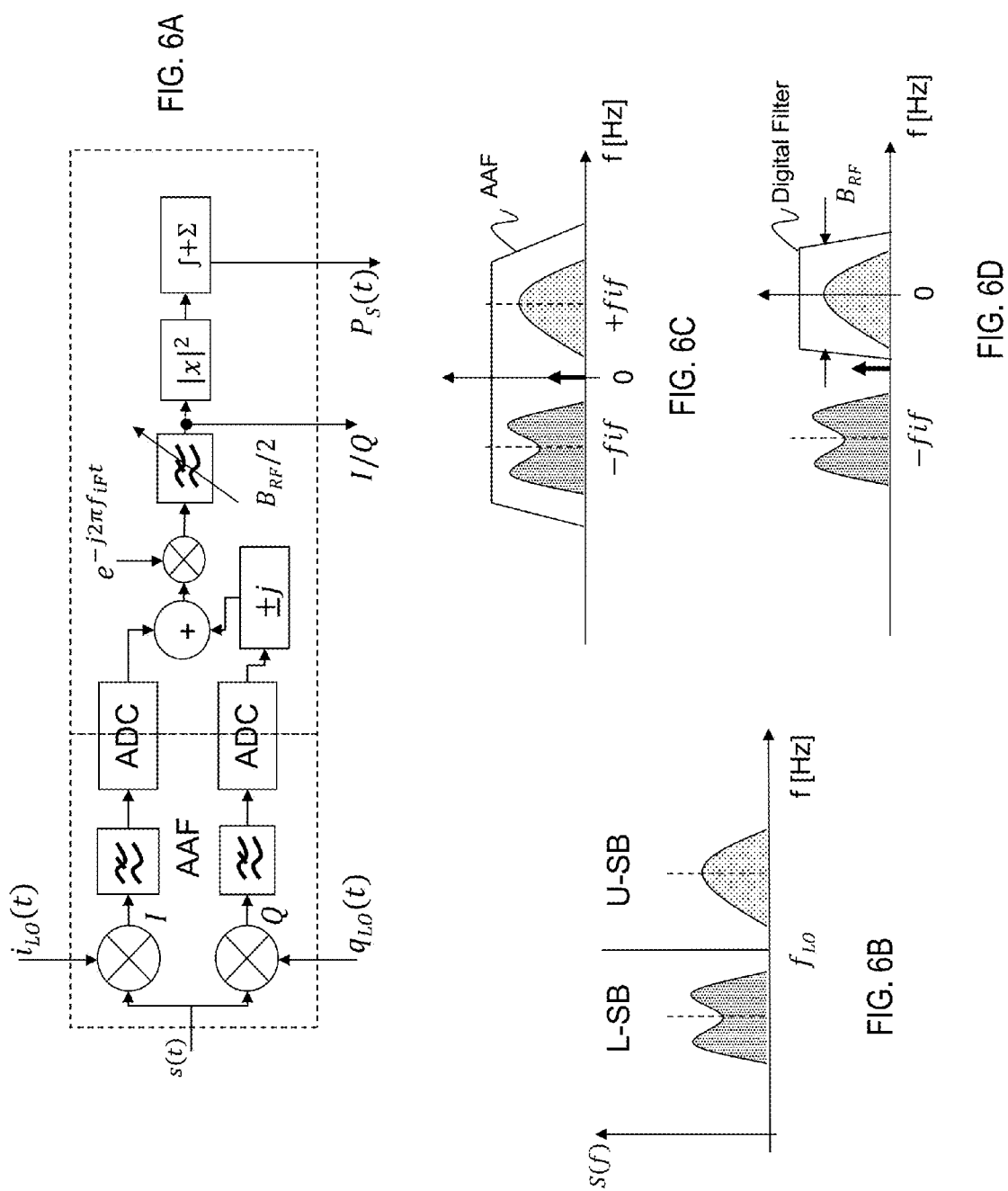

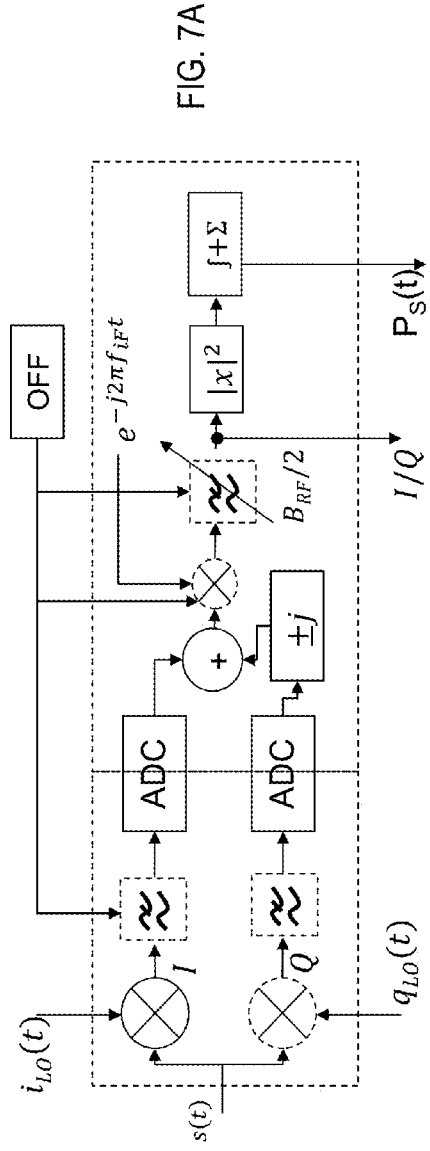
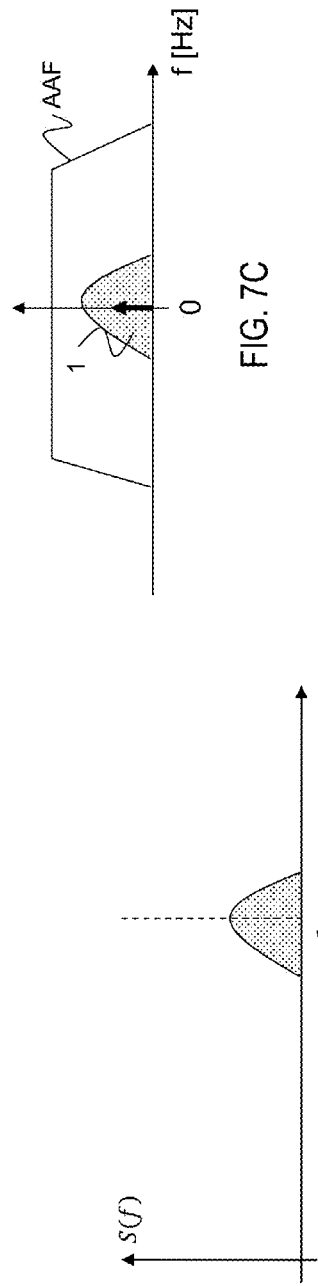
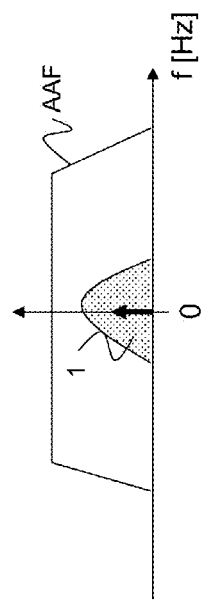
FIG. 7A
FIG. 7B
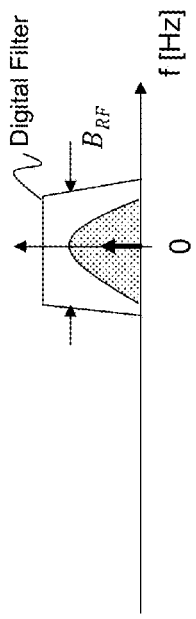
FIG. 7C
FIG. 7D

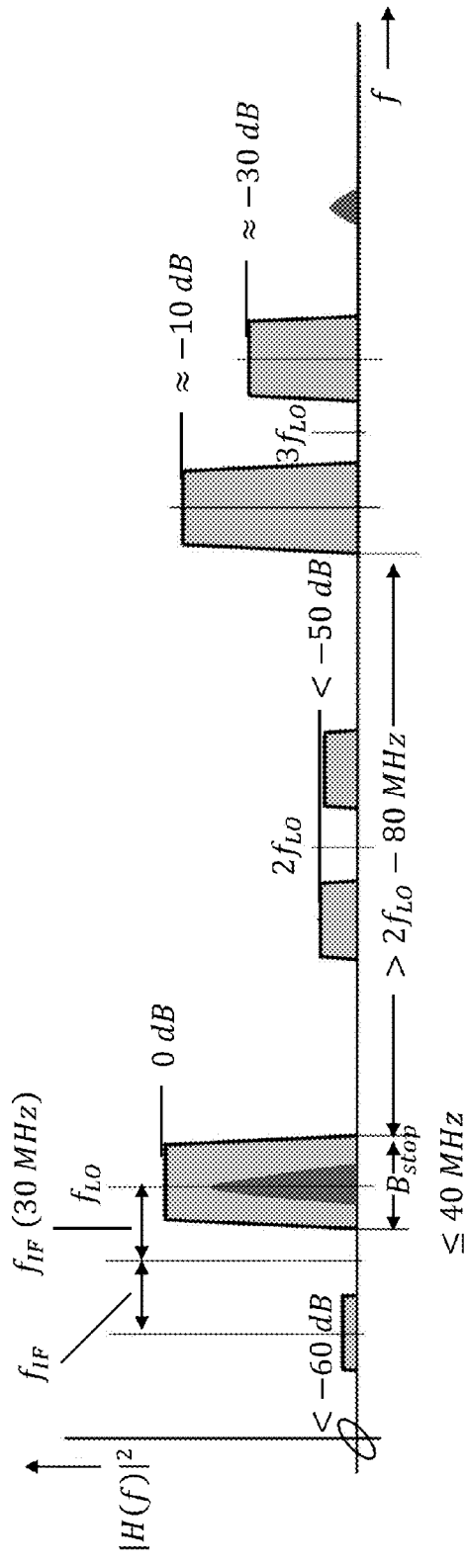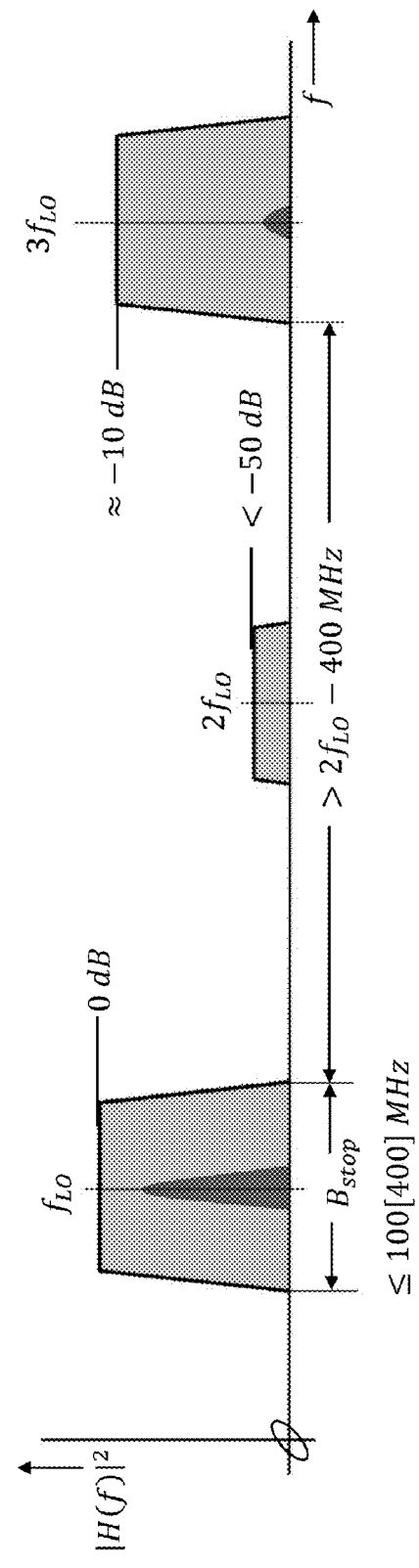

$B_{pass}$: 100 Hz ...26,666 MHz
...66,666 MHz $B_{noise}$: 1,25 $B_{pass}$ $B_{stop}$: 1,5 $B_{pass}$ ≤ 40 MHz
≤ 100 MHz $B_{3dB}$: 100 kHz ...20 MHz
...50 MHz $t_r$: 13 ns   in 50 MHz setting $B_{stop}$: 2 × $B_{pass}$ ≤ 40 MHz
≤ 100 MHz $B_{pass}$: $(N_{sub} - 1)B_{3dB}$ $B_{noise}$: $N_{sub}/(N_{sub} - 1) B_{pass}$ $N_{sub}$: number of sub-bands

FREQUENCY-CONVERTING SENSOR AND SYSTEM FOR PROVIDING A RADIO FREQUENCY SIGNAL PARAMETER

RELATED APPLICATIONS

This application claims the benefit of the earlier filing date under 35 U.S.C. §119(e) of U.S. Provisional Application Ser. No. 62/060,189 (filed Oct. 6, 2014).

FIELD

The invention relates to a frequency-converting sensor and a system for providing at least a radio frequency signal parameter, such as an electrical power value of the radio frequency signal.

BACKGROUND

There exist several different ways of analyzing a radio frequency (RF) signal.

One way of obtaining parameters of an RF signal is to detect the RF-signal with a measurement device, such as a digital oscilloscope or a network analyzer (e.g., (a scalar or vector network analyzer). For instance, the document US 2009/00921177 A1 describes a vector signal measuring system featuring wide bandwidth, large dynamic ranges and high accuracy using a network analyzer. This system incorporates at least two receiver channels per measurement port to provide absolute magnitude and absolute phase relationship. A wideband signal supplied at a specific measurement port of the system is sliced into several frequency sub-bands, wherein each frequency sub-band is analyzed separately and is compared to a parallel reference frequency band of the supplied signal. The measurement is repeated for all sub-bands. This measurement method, however, is very time-consuming and therefore not an efficient method for analyzing wideband signals.

Further, such measurement devices are heavy, space-consuming, complex in structure and highly cost-intensive, and thus are not flexible in use. The measurement devices also require a calibrated measurement probe to detect the RF signal and direct it into the measurement device. The probes, however, lead to measurement errors and influence the characteristics of the RF signal. Such errors may result from, for example, transmission and reflection losses of the probe due to parasitic electrical parameters, and moving of the probe and respective cables during the detection of the RF signal. Further, such measurement errors or inaccuracies cannot be calibrated or corrected.

Moreover, the accuracy of network analyzers or oscilloscopes is between 2 and 3 percent of the measurement signals magnitude. Due to their complex setup, such measurement devices suffer from intolerable ramp-up times. For example, due to the plurality of included modules the measurement devices have high measurement delays that result in long measurement times, especially for small powered input RF signals.

Another way of obtaining signal parameters of an RF signal is the use of specific signal sensors. For instance, the detection of an electrical power value of an RF signal can be achieved by the use of so called power detection sensors, such as sensors as described in the publication DE 2008 052 335 A1. Mainly two different types of power detection sensors currently exist, namely diode-based detecting sensors and thermal-based detecting sensors. Such detecting sensors are directly coupled to the RF signal source and provide an electrical power value at its output. Disadvantageously the use of such sensors is very limited to very specific signal magnitudes. For example, signals below 100 picowatts (−70 dBm) of average power are not properly detectable with such detectors. Especially sensors or detectors for sensing power signals with less than −20 dBm need noise compensation schemes due to their noise dependencies. Such noise compensations are normally realized by a reduction of measurement bandwidths at the output of the detector. An RF signal can therefore only be measured in a specific amount of measurement time. Therefore, a power detection of RF signals with high dynamic power ranges cannot be detected without significant measurement errors or significant measurement times.

What is needed, therefore, is a sensor that accurately analyzes low and high power wideband radio frequency signals in a low complexity and time efficient manner, for example RF signals with low power values (e.g., below 50 dBm). What is further needed is a sensor that is configurable for specific measurement tasks, and that provides signal parameters of the RF signal for efficient further signal analysis, for example, the sensor should provide signal parameters that can be handled easily in remote or subsequent devices without further calculations.

SUMMARY

Embodiments of the present invention advantageously address the foregoing requirements and needs, as well as others, by providing a frequency-converting sensor for providing a radio frequency signal parameter, such as an electrical power value.

In accordance with example embodiments, the sensor comprises an analog receiving section configured to convert an input signal into corresponding analog I/Q values, for example, using a local oscillator frequency. By way of example, the analog receiving section converts the input signal using an I/Q demodulation scheme at a local oscillator frequency. The RF input signal is thereby converted into a corresponding In-phase component (I-value), and Quadrature-phase component (Q-value). The converted I/Q valued signal is a complex-valued signal comprising magnitude and phase information of the input signal.

The sensor further comprises an analog to digital converting unit configured to convert the analog I/Q values into digital I/Q values.

Additionally, the sensor comprises a digital processing unit, which comprises an adjustable filtering unit and a calculating unit. The filtering unit is configured to select a frequency band of the RF input signal. By way of example, the sensor can be operated in two modes. In the first operating mode, wherein the RF input signal is converted to an intermediate frequency, two receive-bands (e.g., a lower side band and an upper side band) are available for each local oscillator frequency. Further, to avoid a superposition of the down-converted signals of both receive-bands in the intermediate frequency range, one receive-band may be suppressed. This is achieved by the I/Q demodulation scheme. In the second operating mode of the sensor, only one receive-band exists for a specific local oscillator frequency. Using the I/Q demodulation scheme, both sidebands can be separated easily since they are not complex conjugated.

By way of further example, for further processing of the digitized I/Q values only one sideband is chosen. Further, the filtering unit filters the digitized I/Q values, wherein the bandwidth and type of filter curve is adjustable for selection of the desired frequency band of the RF signal without distortion of single signal frequencies within the selected band or cutting off of desired frequency components of the RF signal. For example, the filter bandwidth is adjustable, wherein a small band input signal can be filtered with the same high accuracy as if a wideband input filter would be selected. The use of an adjustable filtering unit leads to a sensor operable for highly dynamic range input signals, for example, in case of high powered RF input signals.

The calculating unit is configured to calculate a radio frequency signal parameter (e.g., an electrical power value) from the digitized I/Q values of the selected sideband. By way of example, the calculating unit includes a squaring unit configured to mathematically square the I-values and the Q-values, and an adding unit configured to add a squared I-value to its corresponding squared Q-value to obtain an electrical power value from a corresponding I/Q-value. The corresponding power value is the envelope power value or at least a value proportional to the envelope power value of the input signal value.

In accordance with an example embodiment, the power value is advantageously obtained using a digital processing scheme (e.g., a digital processing unit, such as a digital signal processor (DSP) or a digital central processing unit (CPU)) instead of diode-based sensing elements with non-linear characteristics (as used in the prior art). Diode-based sensing elements produce unwanted frequency components due to non-linear behaviors that need to be deleted in a complex filtering procedure to avoid measurement errors. Additionally, such sensing elements comprise longer measurement times especially if wideband signals are used, which have to be analyzed by using sub-bands. Such complex filtering and longer measurement times are avoided using a sensor in accordance with embodiments of the present invention. Moreover, because such prior art sensing elements are only capable in measuring the total electrical power, an analysis that utilizes sub-bands is not achievable.

By way of example, the calculating unit of the digital processing unit comprises an integrating unit disposed downstream to the squaring unit. In this example, the integration unit is configured to obtain a mean power value, wherein the integration period is relatively equal to one time period of the envelope of the input signal, or an integer multiple thereof. By way of further example, the calculating unit of the digital processing unit further comprises an averaging unit disposed downstream to the integrating unit. In this example, the averaging unit is configured to obtain an averaged power value, which is a calculation to analyze the obtained mean power values by creating a series of mean power values at different subsets of the digitized I/Q values. The obtained series of mean power values are averaged to obtain an averaged mean power value.

In accordance with example embodiments, the frequency-converting sensor is advantageously configured for power detection. The RF signal within the selected receive band is down-converted using a local oscillator frequency and an I/Q demodulation scheme. The resulting analog I/Q signals are digitized using an analog to digital converter. The digitized I/Q values can now be handled in a digital processing unit and the power value can be computed using the sum of each squared I-value and Q-value.

Since the radio frequency signal is converted into digitized I/Q values, the magnitude and phase information of the RF signal are both provided and a selective vector measurement analysis can also be applied. The sensor according to embodiments of the invention can thus be used for a plurality of analyzing purposes, for instance power detection, transmission/reflection losses, magnitude and phase analysis. For example, the S-parameters of a device under test, generating and/or transmitting the RF-signal can easily be analyzed with the inventive sensor. Due to its digitized I/Q values all necessary calculations in the digital processing unit do not suffer from limitations derived from the analog signal processing.

In accordance with example embodiments, the sensor can be implemented in a relatively small and compact form, and thus can be directly coupled to a device under test, without use of extra measurement probes or measurement cables. This leads to higher accuracy of the measuring results.

According to one embodiment, the frequency-converting sensor is operable in at least a first operating mode and a second operating mode, wherein the modes are selectable. The selection of a specific mode, for example, may be dependent on specific signal parameters. This leads to efficient analysis of the RF signal.

By way of example, the second operating mode is used for input signals with an electrical power above a predefined threshold value. In case of RF signals above a predefined threshold value, measurement errors due to local oscillator leakage, 1/f-noise and/or DC-offsets in the analog I/Q paths can be ignored since their influence to the measurement result is not significant. By way of further example, the second operating mode is used for input signals comprising a bandwidth higher than the bandwidth of the intermediate frequency of the intermediate frequency path of the sensor in the first operating mode. Such wideband input RF signals normally are analyzed by dividing the wideband signal frequency in several frequency sub-bands, selecting a specific frequency sub-band of the input RF signal, performing an analysis at the selected frequency sub-band and storing the measurement result. Afterwards, a reselection of an adjacent frequency sub-band occurs and the steps of analyzing and storing are repeated. This procedure is continued until the complete wideband signal has been analyzed. Such a sub-band-shifting analysis is time-consuming and inaccurate when combining the single sub-band results. To avoid such drawbacks and time inefficiencies it is advantageous to switch to the second operating mode, wherein at least the filtering unit of the digital processing unit is deactivated, leading to a higher analyzing bandwidth of the sensor. Additionally or alternatively, also an anti-aliasing filter unit in the analog receiving section is deactivated to further increase the analyzing bandwidth of the sensor.

By way of further example, additionally or alternatively, the analog conversion may be applied using the second operating mode instead of a double sideband demodulation scheme (as in the first operating mode). In this manner, using the second operating mode, the signal is symmetrically arranged around zero hertz, which facilitates handling of the RF signal with higher bandwidths, as compared to prior art sensors.

According to a further embodiment, the digital unit further comprises a frequency shifting unit configured to digitally shift the digital I/Q values, wherein the frequency shifting unit is disposed in between the analog to digital converting unit and the filtering unit. By way of example, the frequency shifting unit shifts a mid-frequency of a sideband of the digitized I/Q valued input signal from the positive or negative intermediate frequency to zero hertz. This frequency shifting advantageously leads to the shifting of unwanted frequency components such as DC offsets and oscillator leakage into the positive or negative frequency spectrum. By adjusting of an appropriate small bandwidth of the filtering unit, those unwanted frequency components can now be filtered out easily. Since the shifting occurs in the digital processing unit, the shifting can be accomplished via a simple mathematical operation as opposed to a complex analog mixing operation (which would lead to further inaccuracies). By way of further example, the shifting frequency may be equal to the positive or negative intermediate frequency, which advantageously leads to a centric shifting of the selected receive-band and allows easy analyzing operations afterwards. By way of further example, the frequency shifting unit is only activated during the first operating mode of the sensor, since the second mode obtains a single sideband conversion scheme and therefore is converted centrically at zero hertz after the analog receiving section.

According to a further embodiment, the analog receiving section comprises an anti-aliasing-filter, wherein the anti-aliasing filter is activated during the first operating mode of the sensor. The anti-aliasing filter filters out unwanted frequency spectrum components, which would lead to an ambiguous representation of the RF input signal.

According to a further embodiment, the sensor further comprises a local oscillator frequency signal interface configured to provide the local oscillator frequency signal to the sensor. Thus a highly accurate local oscillator frequency can be applied leading to a higher accuracy of the signal analyzing procedure. In a case of using at least two sensors for transmission and/or reflection losses the RF signal is converted at the same local oscillator frequency, which avoids local oscillator frequency signal offsets resulting in measurement errors. For example, the S-parameters of a device under test, generating and/or transmitting the RF-signal might be analyzed therewith.

According to a further embodiment, the sensor further comprises a first signal interface configured to provide the input signal, a second signal interface configured to provide the corresponding power value of the input signal and at least a third interface configured to provide the digitized I/Q values for further signal analysis. The provision of digitized I/Q values allows analyzing of the magnitude, the phase as well as transmission/reflection losses of the input RF-signal.

According to a further embodiment, the sensor further comprises a fourth interface configured to provide one or more of a system-clock signal, a trigger signal, a reference signal, and a local oscillator signal, which inputs may be advantageously incorporated for phase-synchronal measurements such as transmission/reflection losses of a signal path transmitting the RF signal.

According to a further embodiment, the sensor obtains a power supply via an I/Q data interface (e.g., a Universal Serial Bus (USB) interface) and/or a local-area-network interface (e.g., Power on Ethernet (PoE)). Additionally, an I/Q data interface may be advantageously used for a bidirectional data connection to transmit the digitized I/Q values to an analyzing measurement device, such as a vector network analyzer or a display device. Alternatively or additionally, the I/Q data interface may comprise a web-interface to transmit web-based content to a remote display device. In such an embodiment, the display device does not necessarily need a data conversion unit for further analyzing of the data.

Embodiments of the present invention further advantageously address the foregoing requirements and needs, as well as others, by providing a system for analyzing a radio frequency signal.

In accordance with example embodiments, the system comprises a device under test, which generates the radio frequency signal. The system further comprises at least a first frequency-converting sensor, as described above, which provides the radio frequency signal parameter (e.g., the electrical power value). The system further comprises a display device configured to display the radio frequency signal parameter.

According to one embodiment, the device under test is directly connected to a first interface of the at least one frequency-converting sensor, and thus no measurement probes or measurement cables are needed to provide the RF signal at the at least one sensor. The influence of parasitic elements of such probes and cables is therefore avoided and the measurement accuracy is further improved.

According to a further embodiment, the display device is connected in a contactless or contact-based manner to a second interface of the at least one frequency-converting sensor, which facilitates presentation of the detected and/or analyzed signal parameters to the display unit without further calculations or processing steps.

According to a further embodiment, the display device is incorporated into a measurement device (e.g., a network analyzer), and the at least one frequency-converting sensor further provides digitized I/Q values via a second interface or via a third interface. The I/Q values might be presented by a web-interface in a web-based manner to allow remote display devices and/or measurement instruments to display the detected and analyzed signal parameters.

According to a further embodiment, the system further comprises at least a second frequency-converting sensor. By way of example, the first sensor supplies a trigger signal to the second sensor or vice versa, supplies a system clock signal to the second sensor or vice versa, and supplies a local oscillator frequency signal to the second sensor or vice versa. The system of this embodiment may be used for vector-based measurements. In this system no further analyzing measurement device is needed and not only scalar values are obtained. Thus, I/Q value pairs are obtained, which are time-aligned. Due to the provision of digitized I/Q values, a measurement of phase-related values is now possible. Further, by the use of two sensors, a vector measurement result is obtained, which facilitates analysis of the S-parameters of the device under test, generating and/or transmitting the RF-signal.

According to a further embodiment, the system further comprises at least a second frequency-converting sensor. By way of example, the first sensor supplies a trigger signal to the second sensor or vice versa, and supplies a system clock signal to the second sensor or vice versa. The system of this embodiment may be used for time-domain system measurements.

According to a further embodiment employing at least two sensors, a reference signal may be provided to the first sensor or the second sensor. The reference signal may be used to stimulate the device under test and analyze the device under test under test conditions. Alternatively, the device under test is tested under real receiving and/or sending conditions.

According to a further embodiment, the system further comprises at least a second frequency-converting sensor. By way of example, the first sensor supplies a trigger signal to the second sensor or vice versa, and a reference signal is provided to the first sensor and the second sensor. The system of this embodiment may be used for time-domain system measurements.

According to a further embodiment, the display device is incorporated into a measurement device, and the system comprises at least a second frequency-converting sensor. By way of example, the first sensor and the second sensor further provide digitized I/Q values to the measurement device for coupled system time measurements. Further, a trigger signal, system clock signal and local oscillator frequency signal may be generated by the measurement device and provided to the sensors by a data interface.

According to such example embodiments, therefore:
the sensor is highly precise and analyzes RF signals on an I/Q valued signal basis. The sensor and the system are thereby useful for power detection, vector network analysis, and spectral analysis as well as signal analysis;
the sensor combines high precision measurements with very limited measurement setup but high precise sensitivity;
the sensor provides envelope power values of signals with pulse rise time less than two nanoseconds;
with the inclusion of an I/Q data interface, the sensor is remotely configurable and provides the analyzed signal parameter, for example, in a web-based manner;
with the direct coupling of the sensor to the device under test (DUT), the sensor avoids parasitic influences of a connecting cable, and a proper matching without (mismatch-influences) is achieved, as compared to spectrum analyzers or measurement receivers;
due to the simple structure, the lifespan of the sensor is significantly increased in comparison with other frequency-converting devices, such as spectrum analyzers;
due to fewer analog components in the measurement setup, the sensor is less temperature and/or time dependent, and is robust, small and light.

Further, compared to conventional sensors, in accordance with such example embodiments the analyzing bandwidth is an additional parameter which can be adjusted by the user or automatically selected by the sensor itself, whereby two different receiving modes are selectable. The measurement noise is only square root dependent in comparison to conventional sensors with a proportional dependency from the inverse power. Power values are measured at the fundamental signal frequency instead of the fundamental signal frequency and all harmonics. Further, if a broadband measuring is desired, the second operating mode might be used, wherein the first operating mode is useful for highly accurate measurement results.

BRIEF DESCRIPTION OF THE DRAWINGS

These and other features, aspects and advantages of the present invention will become better understood with regard to the following description, appended claims and accompanying drawings. Identical components in the drawings are provided with the same reference numbers. Accordingly, embodiments of the present invention are illustrated by way of example, and not by way of limitation, in the figures of the accompanying, in which:

FIG. 1 illustrates a block diagram depicting a sensor according to a first example embodiment of the invention;

FIG. 2 illustrates a block diagram depicting a sensor according to a second example embodiment of the invention;

FIG. 6A illustrates a block diagram of a sensor according to a sixth example embodiment of the invention, and FIGS. 6B, 6C, 6D illustrate corresponding frequency spectra of the sensor of FIG. 6A;

FIG. 7A illustrates a block diagram of a sensor according to a seventh example embodiment of the invention, and FIGS. 7B, 7C, 7D illustrate corresponding frequency spectra of the sensor of FIG. 7A;

FIGS. 8A and 8B illustrate two example receive bands corresponding to respective operating modes of the sensor, in accordance with example embodiments of the present invention;

DETAILED DESCRIPTION

FIG. 1 illustrates a block diagram depicting a sensor 1 according to a first example embodiment of the invention. The sensor 1 comprises a first interface configured to provide an input RF input signal s(t). The sensor 1 further comprises an analog receiving section (ARS), an analog-to-digital (ADC) conversion unit and a digital processing unit (DPU). The sensor 1 further comprises a second interface for providing at least one signal parameter of the RF input signal s(t). For example, in FIG. 1, the at least one signal parameter is a power signal or power value $P_s(t)$.

FIG. 2 illustrates a block diagram depicting a sensor according to a second example embodiment of the invention. As with the sensor 1 of FIG. 1, the sensor 2 also comprises a first interface, an ARS, an ADC conversion unit, a DPU, and a second interface. Additionally, the sensor 2 comprises a third interface for providing digitized I/Q values and a fourth interface for providing a local oscillator frequency $f_{LO}$. The digitized I/Q values are useful for further RF signal analysis, such as S-parameter calculation, vector network analysis and/or frequency analysis, because, in accordance with example embodiments, the sensor provides magnitude and phase information of the input RF signal using digitized I/Q values.

According to further example embodiments, the inventive sensor operates in at least a first operating mode (e.g., a normal receiving mode), or in a second operating mode (e.g., a Zero IF mode). Both modes will be described in greater detail below with reference to FIG. 6 and FIG. 7.

Figure 3:
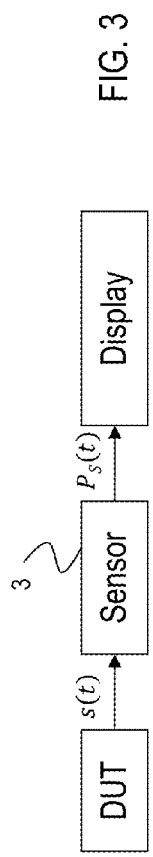
FIG. 3 illustrates a block diagram depicting a system according to a third example embodiment of the invention.

FIG. 3 illustrates a block diagram depicting a system according to a third example embodiment of the invention. The system comprises a device under test (DUT), at least one sensor 3 (which, for example, may consist of either of the sensors 1 or 2 from FIGS. 1 and 2, respectively), and a display unit. By way of example, the DUT generates an RF signal s(t), which is supplied to the sensor 3. The sensor provides at least one signal parameter (e.g., the power value $P_s(t)$), which is obtained from the RF signal s(t), to the display unit. The display unit presents the at least one signal parameter. In the embodiment according to FIG. 3, the sensor 3 provides the power value $P_s(t)$ in a manner that no further calculations or processing are needed. Therefore, for example, the display unit according to FIG. 3 can be a simple screen display or a LCD-display device, which displays the digital values in a readable form.

Further, the at least one signal parameter (e.g., the power value $P_s(t)$) can alternatively be provided via a data interface (e.g., a universal serial bus (USB) or a local area network (LAN) interface, such as Gigabit-LAN). The data can thereby be presented, for example, via a web frontend, which may be located remotely to the DUT and the sensor 3. Accordingly, the digital processing unit DPU may comprise a web interface for such a data presentation.

The sensor may be powered from an external power source (not shown). According to one embodiment, this power source might be interfaced to the sensor by a specific power interface, or, according to a further embodiment, the power source might be interfaced to the sensor by one of the data interfaces (e.g., a USB interface or LAN), which would supply the sensor with the appropriate power. For instance, a Power on Ethernet (PoE) power supply may be incorporated into the sensor. According to a further embodiment, a specific system-clock may be presented via the data interface.

Figure 4:
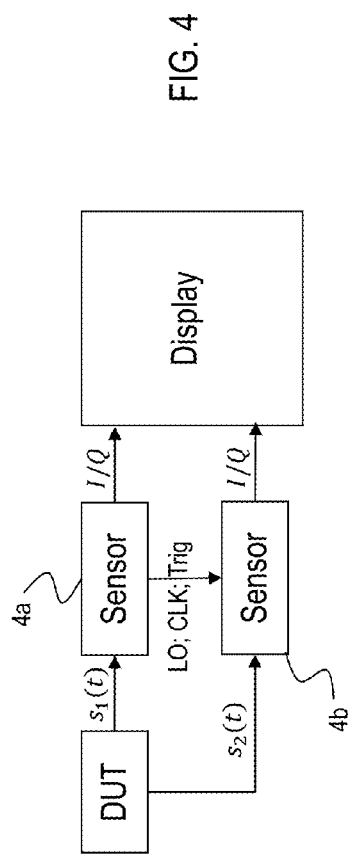
FIG. 4 illustrates a block diagram depicting a system according to a fourth example embodiment of the invention.

FIG. 4 illustrates a block diagram depicting a system according to a fourth example embodiment of the invention. With reference to FIG. 4, in addition to the DUT and display, the system further comprises two sensors 4a and 4b (which, for example, may also consist of either of the sensors 1 or 2 from FIGS. 1 and 2, respectively). The first sensor 4a is connected to the second sensor 4b via a fourth interface. The fourth interface may be configured to provide to the second sensor one or more of the following signals: a trigger signal (TRIG), a system-clock signal (CLK), and a local oscillator signal (LO). By way of example, the first sensor 4a is the master sensor in the system, which supplies the TRIG, CLK and/or LO signals to the second sensor 4b. The sensor 4b obtains the at least one signal from the sensor 4a via a fourth interface and thus is a slave sensor. The master sensor 4a is interchangeable with the slave sensor 4b due to their similar configurations. Moreover, in accordance with further embodiments, the system is not limited to two sensors, and thus further sensors can be incorporated into the system for further signal parameter analysis purposes. The first sensor 4a obtains a first RF input signal $s_1(t)$. The second sensor 1b obtains a second RF input signal $s_2(t)$.

The following provides some specific example scenarios for signal parameter analysis that may be performed with the system of FIG. 4.

In a first example scenario, the master sensor 4a provides a TRIG signal, a CLK signal, and an LO signal to the sensor 4b. The signals TRIG, CLK, and LO are used for a vector measurement of the device under test DUT. As a conclusion, true-life measurements can be applied. In case the DUT is a sending or receiving section of a radio device, it is now possible to simply activate the DUT and measure the DUT under real operating conditions, so called true-life-scenario. The system behaves like a multi-channel vector network analyzer but is less expensive, less complex and more accurate. Additionally, the measurement of pulsed input RF signals is possible. The accuracy of S-parameter detection is highly increased in comparison to a scalar measurement, the measurement is quicker and complex transmission parameter can be obtained. Optionally, a reference signal REF may be applied to either the first sensor 4a or the second sensor 4b. The reference signal REF provides an external connection to a classical 10 MHz reference signal source to synchronize the time basis of the device under test DUT and the sensors 4a, 4b. The reference signal REF can optionally be used for internal calibration of the sensor and aligning the sensors 4a and 4b with respect to environmental parameters.

In a second scenario, the master sensor 4a provides a TRIG signal and a CLK signal to the slave sensor 4b. In this scenario, phase-corrected measurements are possible without a digital trigger oscilloscope or another analyzing measurement device.

In a third scenario, the master sensor 4a provides a TRIG signal and a REF signal to the slave sensor 4b. In this scenario phase-corrected measurements are possible without a digital trigger oscilloscope or another analyzing measurement device.

According to example embodiments, to provide a TRIG signal, the sensor comprises a trigger circuit, which detects a trigger event and generates a trigger impulse. The trigger impulse aligns the sensors 4a and 4b in the system (and, in the case of further sensors, the trigger impulse aligns all sensors of the system), and avoids measurement time offsets. Further, to provide a CLK signal, the sensor 1 may include an internal oscillator circuit configured to generate the system clock signal CLK. The CLK signal is provided to the sensors 4a and 4b in the system (and, in the case of further sensors, the CLK signal is provided to all sensors of the system) to eliminate measurement errors due to system CLK frequency offset. Further, to provide an LO signal, the sensor comprises an internal oscillator source and further obtains input parameters to set up an LO frequency signal, which is provided to each sensor 4a and 4b in the system (and, in the case of further sensors, the LO signal is provided to all sensors of the system) to prevent measurement errors due to an LO frequency offset.

Figure 5:
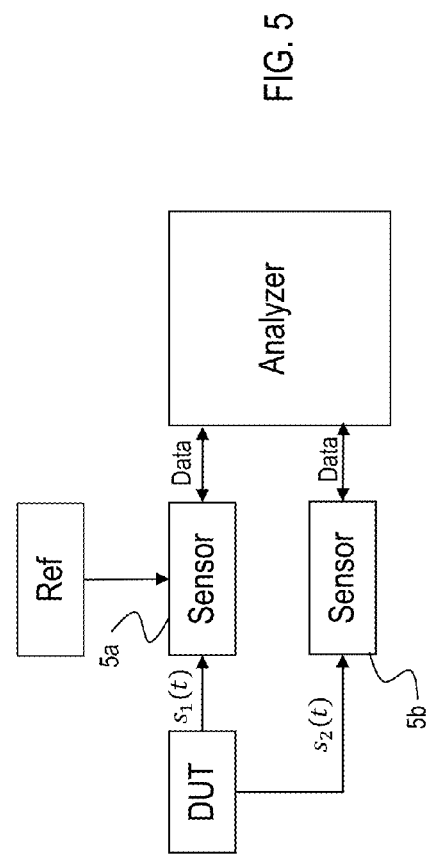
FIG. 5 illustrates a block diagram depicting a system according to a fifth example embodiment of the invention.

FIG. 5 illustrates a block diagram depicting a system according to a fifth example embodiment of the invention. The system according to FIG. 5 also comprises at least two sensors 5a and 5b (which, for example, as with the sensors 4a and 4b of FIG. 4, may also consist of either of the sensors 1 or 2 from FIGS. 1 and 2, respectively). In such embodiments, however, instead of the provision of the TRIG signal, the CLK signal, and LO signal, both sensors 5a and 5b are coupled to an analyzing device, which incorporates the display unit. By way of example, the analyzing device provides the appropriate TRIG, CLK and/or LO signals to both sensors for vector measurements. Using the system according to FIG. 5, no measurement probes or cables for interconnecting the DUT and the analyzer are needed, which significantly increases the measurement accuracy. By way of further example, the data interface DATA between the sensors 5a and 5b and the analyzer device provide digitized I/Q values to the analyzer for further signal analysis.

FIG. 6A illustrates a block diagram of a sensor according to a sixth example embodiment of the invention, and FIGS. 6B, 6C, 6D illustrate corresponding frequency spectra of the sensor of FIG. 6A. The embodiment according to FIG. 6A shows the first operating mode of the sensor. The RF signal $s_1(t)$ is applied at the first interface of the first sensor (4a or 5a), and RF signal $s_2(t)$ is applied at the first interface of the second sensor (4b or 5b). An appropriate power density spectrum S(f) of the RF input signal s(t) is also illustrated. All components of the sensor, which are deactivated during the second operating mode, are shown with dotted lines.

By way of example, the analog receiving section is placed downstream to the first interface, wherein the analog receiving section comprises an I/Q demodulator for converting the RF input signal frequency upper sideband (U-SB) and lower side band (L-SB), located at the local oscillator signal frequency $f_{LO}$ to an intermediate frequency band $f_{if}$ using a local oscillator signal $f_{LO}$. The local oscillator signal $f_{LO}$, for example, is an analog signal, which is generated from an reference signal REF in the digital processing unit in a phase-synchronic manner so that the analog mixing occurs phase coherent to the further signal processing. The resulting analog In-phase value (I value) and Quadrature-phase value (Q value) are each provided to an analog anti-aliasing filter (AAF) to eliminate unwanted frequency components of the RF input signal that would prevent an ambiguous presentation of the RF input signal in the time or frequency-domain.

An upper receive-band sideband and a lower receive-band are obtained after the conversion each arranged at an intermediate frequency $f_{if}$, as shown in FIG. 6C, which also shows the characteristic curve of the analog AAF. The analog anti-aliasing filtered I/Q signals are provided to separate analog-to digital converters for obtaining digitized I/Q values. Afterwards the digitized I/Q values are used to build a complex signal in the real and in the imaginary part, which comprises both receive-band information. Multiplying the complex number with complex sine waves at the negative intermediate frequency $f_{if}$ shifts the whole frequency spectrum to negative frequencies by an amount of the intermediate frequency $f_{if}$. A typical intermediate frequency is 30 Megahertz. The result of the shifting is shown in the frequency spectrum of FIG. 6D.

The shifting unit is used to eliminate the DC offsets and the added pink noise, also referred to as 1/f-noise, of the hardware components of the sensor as well as the local oscillator leakage, which are represented as a DC-peak in FIG. 6C. This DC-peak is a parasitic component of the frequency spectrum and is not included in the original RF input signal. Due to the aforementioned shifting process, the unwanted components fall outside the path band of the analyzing filter, and thereby will not influence the input measurement results.

By way of further example, an adjustable filtering unit is disposed downstream to the frequency shifting unit. The adjustable filtering unit selects the frequency band of the input signal to be measured. The resulting bandwidth of the adjustable filtering unit ($B_{RF}$) is adjustable as well as the mid-frequency. In a tracking mode of the sensor, the resulting mid-frequency follows an unwanted frequency shift of the signal frequency for proper analysis. A calculating unit (e.g., a squaring unit ($|x|^2$), integration unit (∫) and averaging unit (Σ) are disposed downstream to the filtering unit to obtain the respective envelope power value, the mean power value as well as the averaged mean power value, as described above.

By way of further example, in case the video bandwidth ($B_{vid}$) of the RF input signal s(t) is small (e.g., less than one Hertz), measuring time can be reduced if the first mean power value is displayed, wherein, in the background, an averaging occurs. Whenever an updated power value is calculated, the display obtains the updated value for displaying purposes.

As a result, the averaged power value $P_s(t)$ is obtained at the second interface of the sensor. Additionally, the digitized I/Q values are presented at the third interface of the sensor for further network analysis, signal analysis or magnitude/phase analysis of the RF input signal.

FIG. 7A illustrates a block diagram of a sensor according to a seventh example embodiment of the invention, and FIGS. 7B, 7C, 7D illustrate corresponding frequency spectra of the sensor of FIG. 7A. In principle the structure of the sensor according to FIG. 7A is equal to the structure of the sensor according to FIG. 6A. In FIG. 7A, the second operating mode of the sensor shown, which may be activated by wideband and/or RF input signals with significant power values. In the following, only the differences of the embodiment of FIG. 7A relative to the embodiment according to FIG. 6A are described. The sensor is switchable between the first operating mode and the second operating mode, for example, using a switch, which may be activated by the user or in an automatic manner whenever the signal parameter crosses a predefined threshold. The modes are thereby selected either by choice of the user or automatically during the analyzing of the RF input signal. All components of the sensor, which are deactivated during the second operating mode, are shown with dotted lines. Using the other demodulation scheme, the signal is symmetrically arranged around zero hertz which allows an easier handling of the RF signal without time-consuming measurements. This leads to a spectrum S(f) of the RF signal s(t) as shown in the frequency spectrum of FIG. 7B. This leads to a single receive band, which is represented by a spectrum S(f) of the RF input signal.

In FIG. 7C, the corresponding AAF curve is illustrated. By way of example, to increase the input bandwidth of the filter, the AAF may also be switched off in the second operating mode. Also the shifting unit is switched off, since the appropriate spectrum of the signal is already at zero Hertz, thus the DC leakage is not removed from the frequency spectrum. The adjustable filtering unit can optionally be switched off too.

FIGS. 8A and 8B illustrate two example receive bands corresponding to respective operating modes of the sensor, in accordance with example embodiments of the present invention.

In FIG. 8A, the resulting sensitivity versus frequency according to the first operating mode (see, e.g., FIG. 6A) is shown. The analog conversion generates noise bands at each integer-multiple of the local oscillator frequency, $f_{LO}$, $2*f_{LO}$, $3*f_{LO}$. Accordingly, integer-multiple harmonics of the RF input signal do not fall into the receive band, as shown in FIG. 8A. The spectral parts of the local oscillator signal $f_{LO}$ do not prevent the spectral components of the RF input signal to be measured, since they are not placed at an integer-multiple of the local oscillator frequency. The converted signal, therefore, does not include unwanted frequency spectrum components and only the RF signal itself is selected and only the fundamental wave is selected.

In FIG. 8B, the resulting sensitivity versus frequency according to the second operating mode (see, e.g., FIG. 7A) is shown. Here the third integer-multiple $3*f_{LO}$ of the local oscillator is equal to the third harmonic of the RF input signal which results in an influence of the third harmonic of the RF-signal s(t) in the second mode of the sensor. Since the signal parameters should be analyzed without any harmonics of the RF signal, those frequency components should be filtered.

Figure 9A:
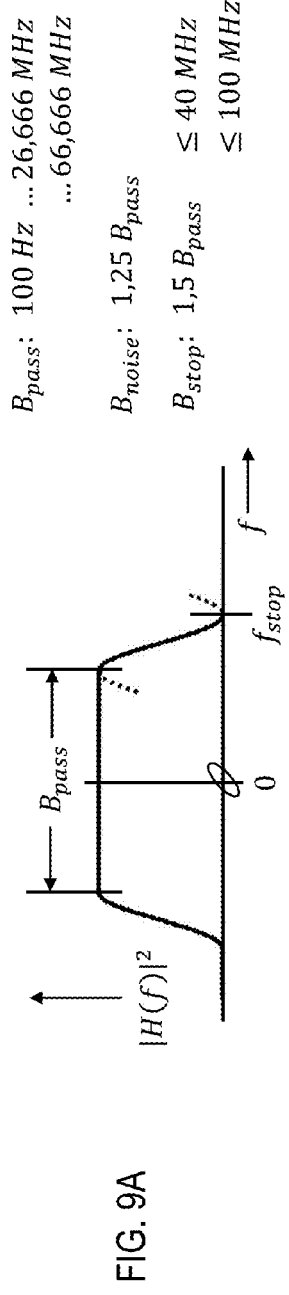
FIGS. 9A, 9B, 9C illustrate characteristic curves of respective filtering units, in accordance with example embodiments of the present invention.
Figure 9B:
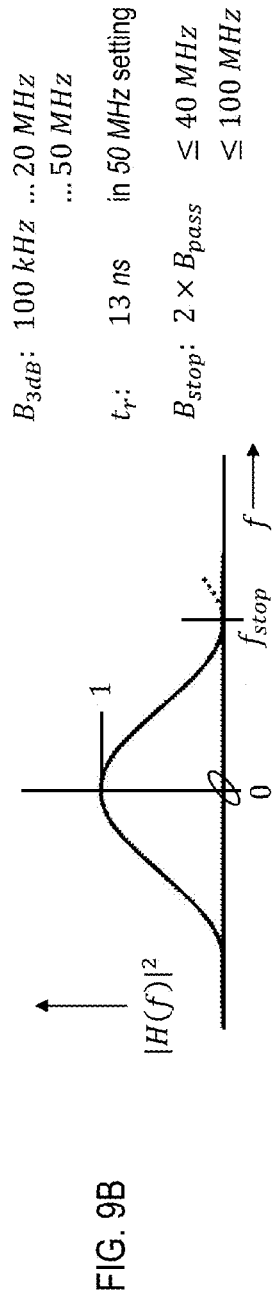
Figure 9C:
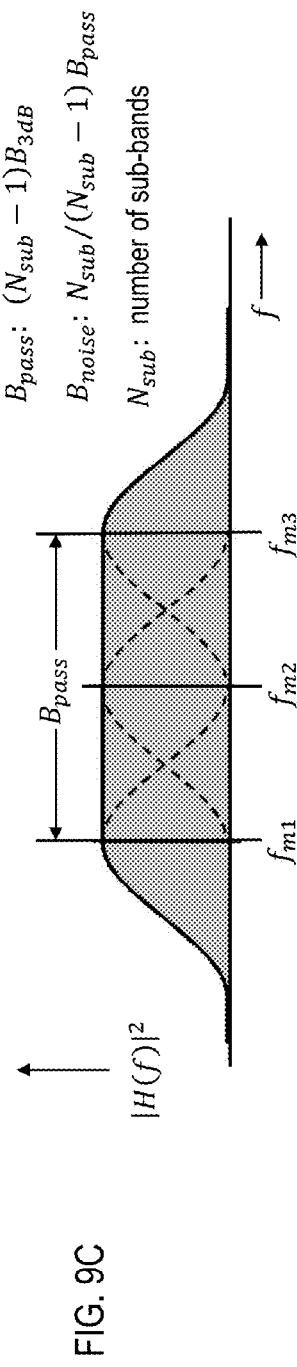

FIGS. 9A, 9B, 9C illustrate characteristic curves of respective filtering units, in accordance with example embodiments of the present invention. By way of example, the characteristic curves of the filtering unit are adjustable to the specific measuring task to obtain the most accurate measuring result.

In FIG. 9A, the filtering unit type is a root-raised-cosine filter with a roll off factor of 0.2. This filter type may be applied for mean power values since all spectral parts of the RF signal are detected and weighted equally for further calculations.

In FIG. 9B, the filtering unit type is also a cosine filter, but with a cosine roll off factor of 1. This filter type may be applied for time-based measurements at edged signals, since such a filter type does not overshoot, so in case of envelope power values no distortion of spectral parts of the RF signal is obtained for further calculations.

In FIG. 9C, the filtering unit type is also a cosine filter with a cosine roll off factor of 1. Due to a wideband character of the RF signal the filtering unit obtains an adjustable mid-frequency $f_m$, which is shown in FIG. 9C (dotted lines) at curves $f_{m1}$, $f_{m2}$, $f_{m3}$. FIG. 9C shows an assembled/composite measurement using 3 sub-bands, so $N_{sub}$ is 3. This type of filter may be applied for mean power values of a wideband RF signal, because the sub-bands merge to a frequency band with flat amplitude responses.

Figure 10:
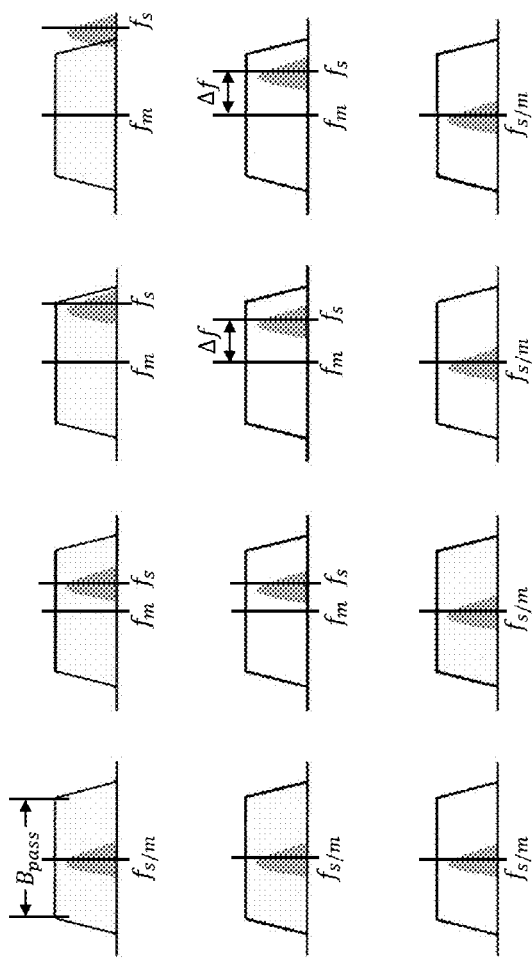
FIG. 10 illustrates a signal frequency tracking scheme, in accordance with example embodiments of the present invention.

FIG. 10 illustrates a signal frequency tracking scheme, in accordance with example embodiments of the present invention. In FIG. 10, due to environmental issues (e.g., temperature rise, etc.), differences between the signal mid-frequency and the frequency of the local oscillator $f_{LO}$ may vary, which results in a shift of the frequency spectrum of the signal at the input of the filtering unit. Since the mid-frequency $f_m$ of the filtering unit will stay fixed, the unwanted effect according to the upper row of FIG. 10 is obtained, where the signal is distorted by the filtering unit, if the offset between filtering frequency and signal frequency exceeds a certain threshold value. The signal leaves the filter path band, so that it is attenuated, which leads to a systematic measurement failure. The middle row in FIG. 10 shows a regulation according to prior art schemes. Due to the properties of a classical automatic frequency control AFC there is always an offset between filtering frequency and signal frequency, if there is a linear shift over time between both frequencies.

According to example embodiments of the invention, no regulation is applied. Instead a regression analysis with additional extrapolation is applied, leading to a maximum-likelihood assumption and a complete tracking of the signal frequency. This is accomplished, for example, by a separate receive channel after the digital response channel. As a result, no regulation offset is obtained and the accuracy of the measurement is largely increased.

Figure 11:
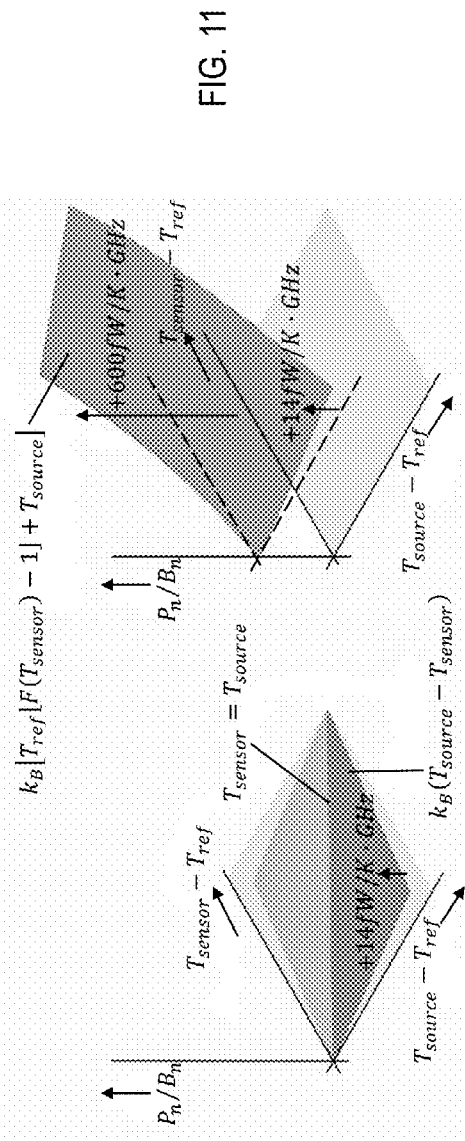
FIG. 11 illustrates a specific temperature-dependent noise power profile of a prior art power detector (shown in left part of FIG. 11) in comparison with that of a power detection mode of a sensor according to example embodiments of the present invention (shown in right part of FIG. 11)

FIG. 11 illustrates a specific temperature-dependent noise power profile of a prior art power detector (shown in left part of FIG. 11) in comparison with that of a power detection mode of a sensor according to example embodiments of the present invention (shown in right part of FIG. 11). The results herein are defined for a specific bandwidth. Accordingly, the classical power detector comprises a less dynamic temperature noise power dependency. The lowest measuring level for the prior art detector is approximately 100 picowatts/−70 dBm. Whereas, with a sensor in accordance with example embodiments of the invention, power detection is possible at as low as 0.3 femtowatts/−95 dBm for a bandwidth $B_{RF}$ of 100 Megahertz and 0.1 femtowatts/−130 dBm for a bandwidth $B_{RF}$ of 10 Megahertz of the filtering unit. Wideband signals should thus be measured with the second operating mode and narrowband signals with the first operating mode.

Figure 12:
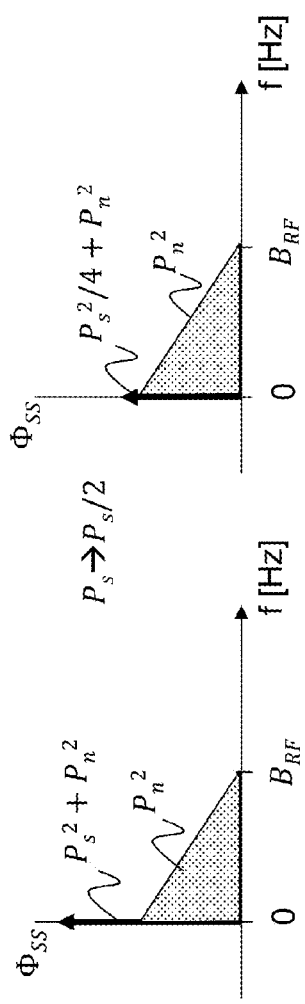
FIG. 12 illustrates a noise scheme at a low input power level, in accordance with example embodiments of the present invention.

FIG. 12 illustrates a noise scheme at a low input power level, in accordance with example embodiments of the present invention. The noise power $P_n^2$ at the output of the squaring unit stays the same when the signal power $P_s^2$ is reduced (here factor ½). The absolute measurement noise is independent of the signal power. A reduction of the power by factor X increases the relative part of the measurement noise in comparison to the mean power also by factor X.

Figure 13:
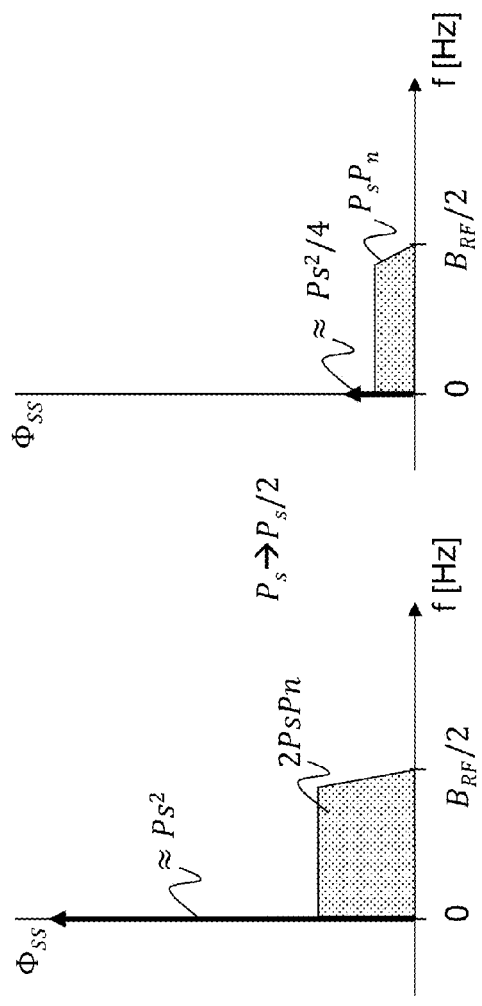
FIG. 13 illustrates a noise scheme a high input power level, in accordance with example embodiments of the present invention.

In contrast, FIG. 13 illustrates a noise scheme a high input power level, in accordance with example embodiments of the present invention. The absolute measurement noise power value is proportional to the signal power. A reduction of the signal power by factor X increases the relative part of the measurement noise in comparison to the mean power only by factor square root of X. Therefore, the change of the relative noise content is a function of the signal power. Accordingly, if small power signals are applied to the sensor, the noise dependency is greater.

Figure 14:
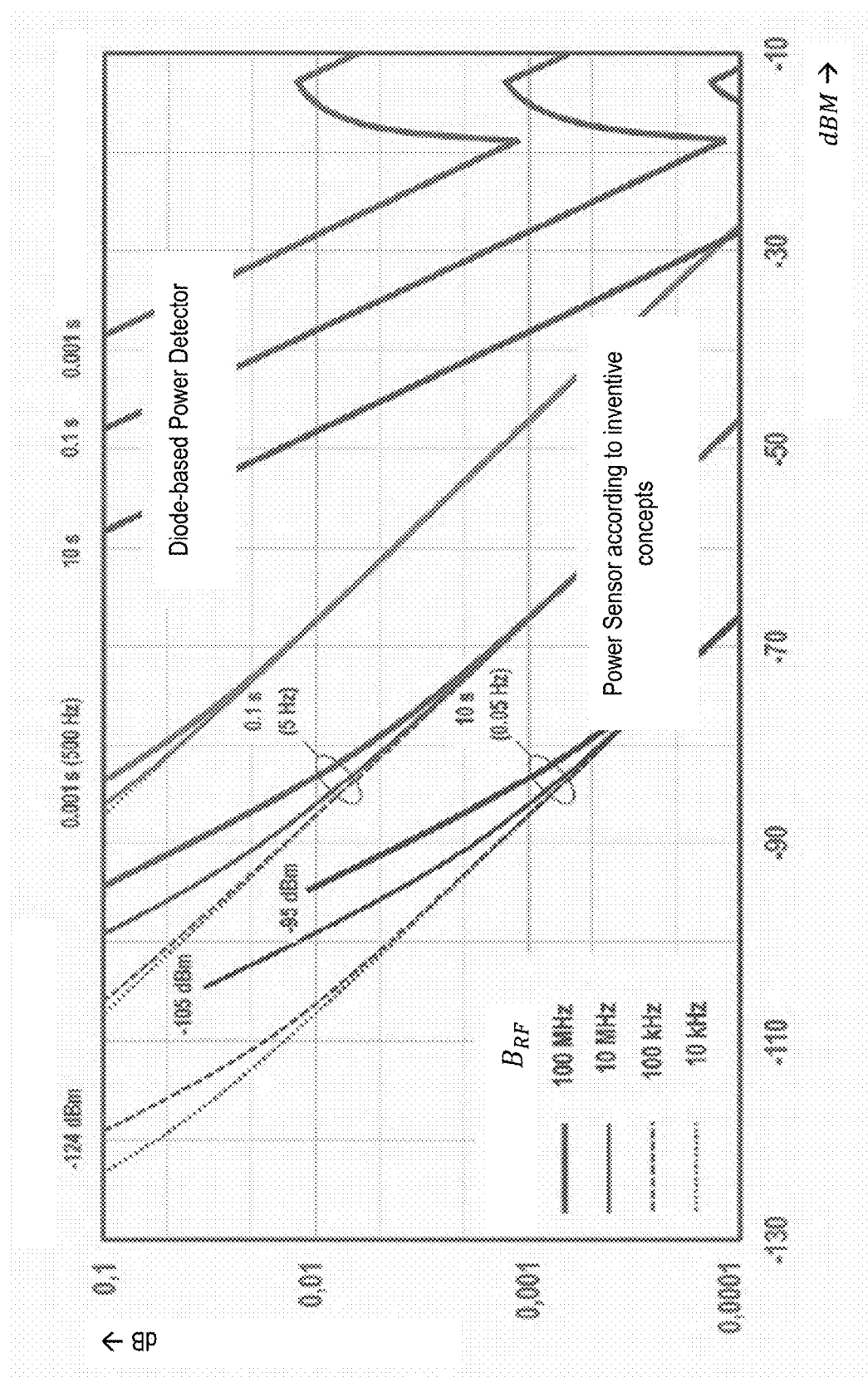
FIG. 14 illustrates the relative signal noise power in Decibels versus signal power in dBm at different filtering bandwidths and with different measuring times, in accordance with example embodiments of the present invention.

FIG. 14 illustrates the relative signal noise power in Decibels versus signal power in dBm at different filtering bandwidths $B_{RF}$ and with different measuring times, in accordance with example embodiments of the present invention. The input RF signals are sin signals. The sensor according to example embodiments is highly accurate compared to a prior art power detector using diode-based sensing elements. Using the inventive sensor, a lower measuring limit of −130 dBm is detectable, wherein the prior art detectors obtain −50 dBm.

Figure 15:
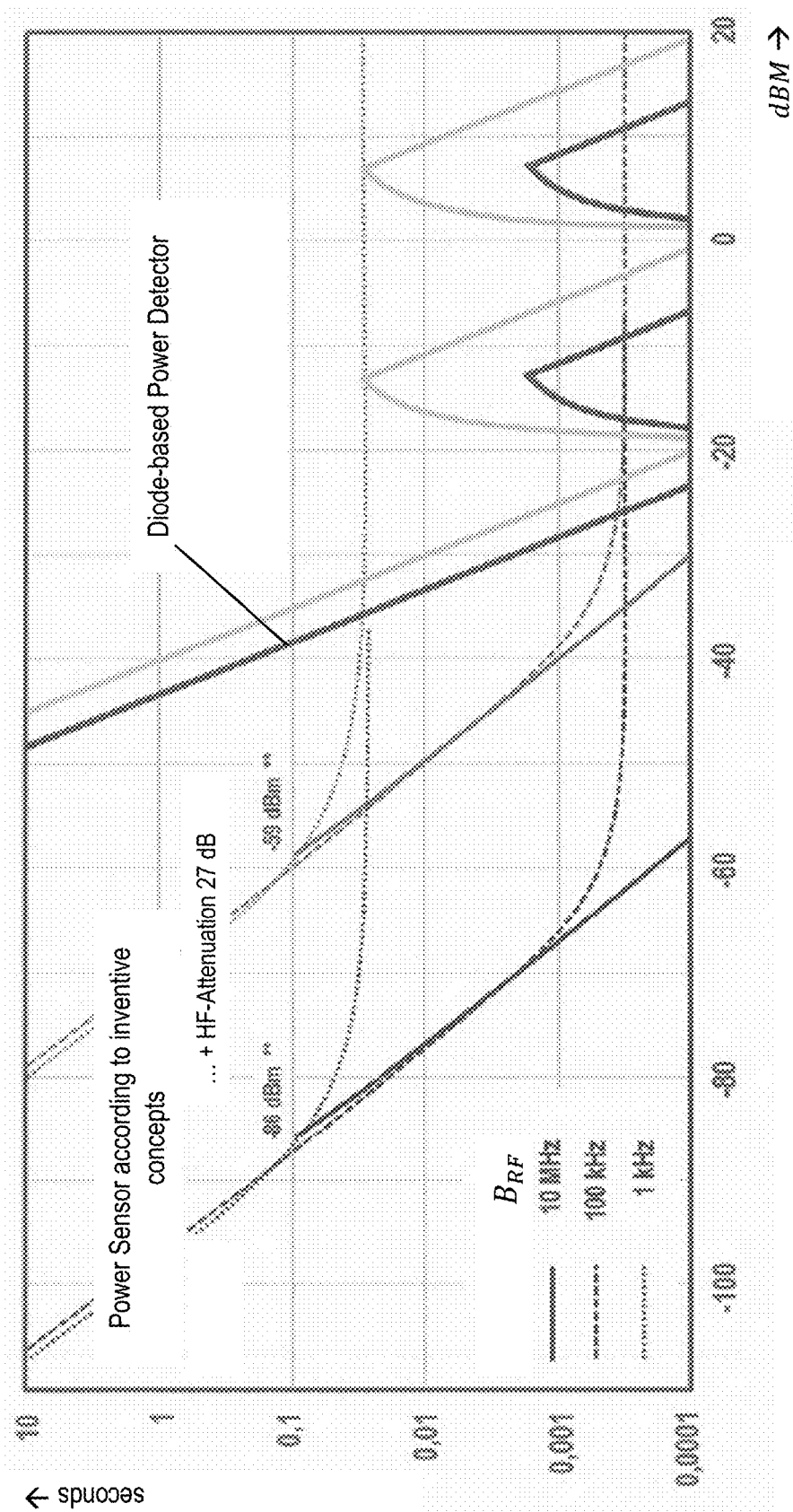
FIG. 15 illustrates a measurement time scheme at different filtering bandwidths of a continuous wave signal, in accordance with example embodiments of the present invention.

FIG. 15 illustrates a measurement time scheme at different filtering bandwidths $B_{RF}$ of a continuous wave signal, in accordance with example embodiments of the present invention. The portion of noise is 0.01 decibel (2σ), wherein the minimum power of the signal is chosen to obtain a zero drift that is no more than 0.01 decibel per Kelvin. FIG. 15 shows an achievable measurement time in seconds versus signal power in dBm. The sensor according to example embodiments is faster compared to prior art power detectors using diode-based sensing elements. Using the sensor according to example embodiments, a lower measuring limit of −86 dBm is detectable at 0.1 seconds measuring time. Further, the sensor according to example embodiments can be pre-attenuated by a pre-attenuation unit. By using a pre-attenuation of 27 dB, for example, a measuring limit of −59 dBm at 0.1 seconds measuring time is achievable, whereas the prior art detectors is less than −40 dBm.

Figure 16:
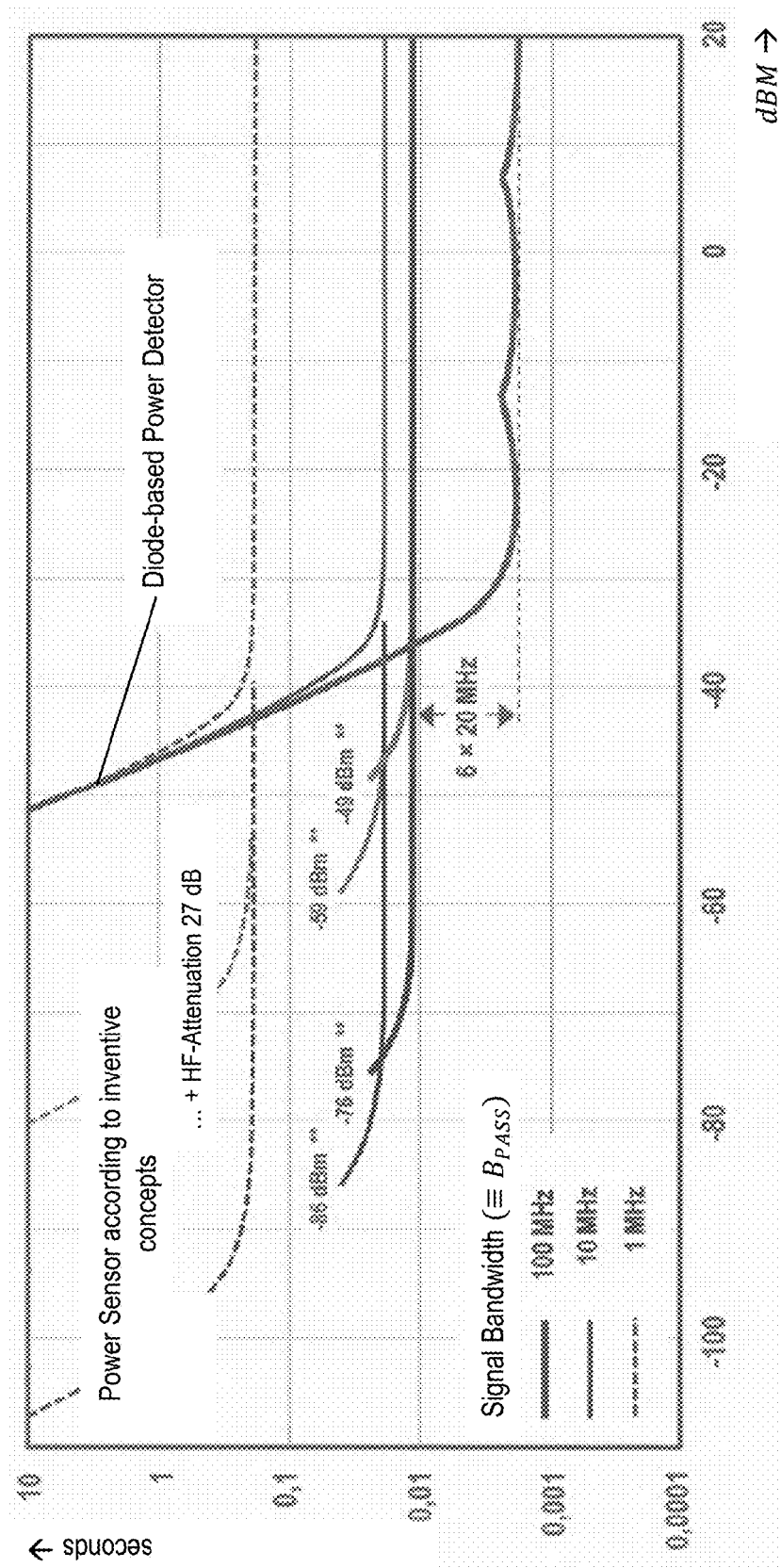
FIG. 16 illustrates a measurement time scheme at different signal bandwidths of an Additive White Gaussian Noise signal, in accordance with example embodiments of the present invention.

FIG. 16 illustrates a measurement time scheme at different signal bandwidths $B_{PASS}$ of an Additive White Gaussian Noise signal (e.g., short AWGN signal), in accordance with example embodiments of the present invention. By way of example, the filter setting of the root-raised cosine filter may be selected equally to the noise power bandwidth of the input signal. The relative portion of noise is 0.02 decibel (2σ), wherein the minimum power of the signal is chosen to obtain a zero drift that is no more than 0.01 decibel per Kelvin. The sensor according to example embodiments is more sensitive compared to prior art power detectors using diode-based sensing elements. Using the sensor according to example embodiments with activated pre-attenuation (e.g., of 27 decibels), the measurement times are equal, but the sensor according to example embodiments encompasses a higher dynamic range, which is shown with dotted lines in FIG. 16.

Figure 17:
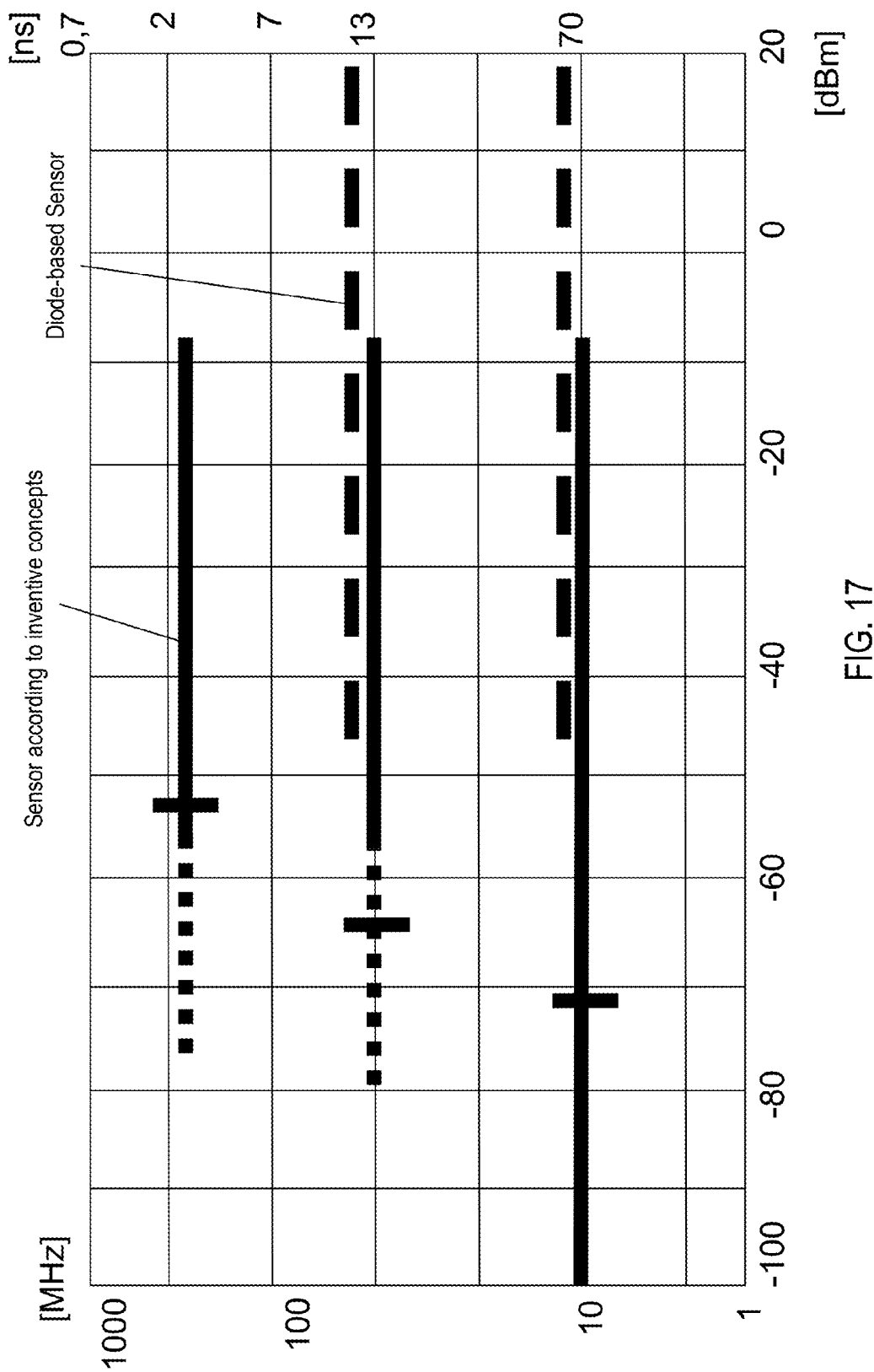
FIG. 17 illustrates the dynamic range of the sensor in trace mode compared to sensors using diode-based elements, in accordance with example embodiments of the present invention.

FIG. 17 illustrates the dynamic range of the sensor in trace mode compared to sensors using diode-based elements, in accordance with example embodiments of the present invention. In the two upper characteristic curves, the sensor in accordance with example embodiments operates in the second operating mode. Due to local oscillator leakage the lower measurement value is limited.

The sensor according to example embodiments is not comparable to other measurement devices or sensing devices. The sensitivity and dynamic ranges are significantly increased, wherein at the same time the complexity is significantly reduced.

The sensor according to example embodiments is useful as a combining device, such as signal analyzing, spectral analyzing, vector analyzing and power analyzing device in a single device.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense. Further, the aspects of the various embodiments described, shown and/or claimed herein can be combined with each other, and the features of the method claims can also be features of the device claims and vice versa.

What is claimed is:

1. An apparatus comprising:
an analog receiver configured to receive an input radio frequency (RF) signal and to convert the signal into corresponding I/Q values using a local oscillator frequency signal;
analog to digital (A/D) converters configured to respectively convert the corresponding analog I/Q values into digital I/Q values;
a digital processor, disposed downstream from the A/D converters, configured to process a resulting signal based on the digital I/Q values, wherein the digital processor comprises an adjustable filter configured to select a frequency band of the input RF signal, and a calculating unit configured to calculate at least one RF signal parameter from the I/Q values of the selected frequency band;
a first signal interface configured to provide the at least one RF signal parameter; and
a second signal interface configured to provide the digitized I/Q values for further RF signal analysis, and
wherein the apparatus is configured to operate in one or more of a first operating mode consisting of a normal receiving mode involving an intermediate frequency, and a second operating mode consisting of a single receive band receiving mode involving a down-conversion to approximately zero hertz, and in the second receiving mode the adjustable filter of the digital processor is deactivated.

2. The apparatus according to claim 1, wherein the at least one RF signal parameter comprises an electrical power value.

3. The apparatus according to claim 1, wherein the second operating mode is selected for input signals comprising a bandwidth higher than the bandwidth of an intermediate frequency and/or for input signals with an electrical power value above a predefined threshold value.

4. The apparatus according to claim 1, wherein the digital processor further comprises a frequency shifter configured to digitally shift the digital I/Q values with an intermediate frequency signal, and wherein the frequency shifter is disposed between the analog to digital converter and the filter.

5. The apparatus according to claim 4, wherein the frequency shifter is activated in a first operating mode of the sensor.

6. The apparatus according to claim 1, wherein the analog receiver comprises an anti-aliasing-filter, wherein the anti-aliasing filter is activated in a first operating mode of the apparatus.

7. The apparatus according to claim 1, wherein the apparatus further comprises a local frequency oscillator signal interface configured to provide the local oscillator frequency signal.

8. The apparatus according to claim 1, wherein the apparatus further comprises a third signal interface configured to provide the RF input signal, wherein the first signal interface is configured to provide an electrical power value as a one of the at least one RF signal parameter.

9. The apparatus according to claim 8, wherein the apparatus further comprises a fourth signal interface configured to provide one or more of a system-clock signal, a trigger signal and a reference signal.

10. The apparatus according to claim 1, wherein the apparatus obtains a power supply via a bidirectional data interface.

11. The apparatus according to claim 1, wherein the apparatus provides the at least one RF signal parameter via a web-based interface.

12. A system for analyzing an input radio frequency (RF) signal, the system comprising:
a device under test configured to generate the input RF signal;
a first frequency-converting sensor comprising
an analog receiver configured to receive the input RF signal and to convert the signal into corresponding I/Q values using a local oscillator frequency signal,
analog to digital (A/D) converters configured to respectively convert the corresponding analog I/Q values into digital I/Q values,
a digital processor, disposed downstream from the A/D converters, configured to process a resulting signal based on the digital I/Q values, wherein the digital processor comprises an adjustable filter configured to select a sideband of the digital I/Q values, and a calculating unit configured to calculate at least one RF signal parameter from the I/Q values of the selected sideband,
a first signal interface configured to provide the at least one RF signal parameter, and
a second signal interface configured to provide the digitized I/Q values for further RF signal analysis, and
wherein the first frequency-converting sensor is configured to operate in one or more of a first operating mode consisting of a normal receiving mode involving an intermediate frequency, and a second operating mode consisting of a single receive band receiving mode involving a down-conversion to approximately zero hertz, and in the second receiving mode the adjustable filter of the digital processor is deactivated; and a display device configured to display the at least one RF signal parameter.

13. The system according to claim 12, wherein the device under test is directly connected to a test signal interface of the first frequency-converting sensor.

14. The system according to claim 12, wherein the display device is contactless or contact-based, and is connected to the first signal interface of the first frequency-converting sensor.

15. The system according to claim 14, wherein the display device is incorporated into the first frequency-converting sensor, and the first frequency-converting sensor provides the digital I/Q values via the second signal interface or via the first signal interface.

16. The system according to claim 12, further comprising:
a second frequency-converting sensor, wherein the first frequency-converting sensor supplies a trigger signal, a system clock signal and a local oscillator frequency signal to the second frequency-converting sensor, and
wherein the system is configured to perform vector-based measurements.

17. The system according to claim 16, wherein a reference signal is provided to the first frequency-converting sensor or to the second frequency-converting sensor.

18. The system according to claim 12, further comprising:
a second frequency-converting sensor, wherein the first frequency-converting sensor supplies a trigger signal and a system clock signal to the second frequency-converting sensor, and
wherein the system is configured to perform time-domain system measurements.

19. The system according to claim 18, wherein a reference signal is provided to the first frequency-converting sensor or to the second frequency-converting sensor.

20. The system according to claim 12, further comprising:
a second frequency-converting sensor, wherein the first frequency-converting sensor supplies a trigger signal to the second frequency-converting sensor, and
wherein a reference signal is provided to the first frequency-converting sensor and to the second frequency-converting sensor, and
wherein the system is configured to perform time-domain system measurements.

21. The system according to claim 12, wherein the display device is incorporated into a measurement device, the system further comprising:
a second frequency-converting sensor, wherein the first frequency-converting sensor and the second frequency-converting sensor further provide digitized I/Q values to the measurement device for time-domain system measurements.

* * * * *